(12) United States Patent
Bijl et al.

(10) Patent No.: US 6,173,259 B1
(45) Date of Patent: Jan. 9, 2001

(54) SPEECH TO TEXT CONVERSION (75) Inventors: David Bijl, Malvern; Henry Hyde-Thomson, London, both of (GB)

(73) Assignee: Speech Machines PLC, North Hampton (GB)

( * ) Notice: Under 35 U.S.C. 154(b), the term of this patent shall be extended for 0 days.

(21) Appl. No.: 09/049,771

(22) Filed: Mar. 27, 1998

(30) Foreign Application Priority Data

Mar. 27, 1997 (GB) .................................................. 9706408

(51) Int. Cl.$^7$ .................................................. G01L 15/26
(52) U.S. Cl. .................................................. 704/235; 704/270
(58) Field of Search .................................................. 704/235, 231, 704/260, 270

(56) References Cited

U.S. PATENT DOCUMENTS

| | | | |
|---|---|---|---|
| 5,528,739 | * | 6/1996 | Lucas et al. ........................ 707/526 |
| 5,557,659 | * | 9/1996 | Hyde-Thomson .................... 379/88 |
| 5,632,002 | * | 5/1997 | Hashimoto et al. ................. 704/231 |
| 5,799,273 | * | 8/1998 | Mitchell et al. .................... 704/235 |
| 5,909,667 | * | 6/1999 | Leontiades et al. ................. 704/275 |
| 5,920,835 | * | 7/1999 | Huzenlaub et al. ................. 704/235 |
| 5,953,392 | * | 9/1999 | Rhie et al. ........................ 379/88.13 |
| 5,956,681 | * | 9/1999 | Yamakita ............................ 704/260 |

FOREIGN PATENT DOCUMENTS 2 082 820 * 3/1982 (GB) .............................. G10L/1/00

* cited by examiner

*Primary Examiner*—David R. Hudspeth
*Assistant Examiner*—Abul K. Azad
(74) *Attorney, Agent, or Firm*—Kilpatrick Stockton (57) ABSTRACT

A speech-to-text conversion system is provided which comprises at least one user terminal for recording speech, at least one automatic speech recognition processor to generate text from a recorded speech file, and communication means operative to return a corresponding text file to a user, in which said at least one user terminal is remote from said at least one automatic speech recognition processor, and a server is provided remote from said at least one user terminal to control the transfer of recorded speech files to a selected automatic speech recognition processor.

16 Claims, 11 Drawing Sheets

SPEECH TO TEXT CONVERSION

FIELD OF THE INVENTION

The present invention relates to apparatus and methods for speech to text conversion using automatic speech recognition, and has various aspects.

BACKGROUND OF THE INVENTION

Automatic speech recognition, as such, is known from, for example, "Automatic Speech Recognition" by Kai-Fu Lee, Kluwer Academic Publishers 1989.

Conventional known systems for converting speech to text involving automatic speech recognition are desktop stand alone systems, in which each user needs his or her own system. Such known speech to text conversion systems have been produced by such companies as International Business Machines, Kurzweil Applied Intelligence Inc and Dragon Systems.

These known systems are able to transcribe human speech to text, albeit imperfectly. The text results are presented to the user after a small delay whilst he or she is still dictating. This has a number of disadvantages. Firstly the instantaneous text presentation can confuse and alter the behaviour of the user who is speaking. Also, it requires that the user must themselves correct errors, usually using a text editor. Accordingly, the user must switch between the tasks of speaking and correcting, resulting in inefficiency.

IBM and Dragon have produced desktop speech to text conversion systems which are adapted to understand the speech of a particular user.

A method of sending text data together with speech data in a single file over a computer network is known from U.S. Pat. No. 55769.

In a first aspect, the present invention relates to a speech to text convertor comprising at least one user terminal for recording speech, at least one automatic speech recognition processor, and communication means operative to return the resulting text to a user, in which said at least one user terminal is remote from said at least one automatic speech recognition processor, the speech to text convertor including a server remote from said at least one user terminal, the server being operative to control transfer of recorded speech files to a selected automatic speech recognition processor.

BRIEF SUMMARY OF THE INVENTION

Preferably, the or each user terminal communicates the recorded speech files to the remote server by electronic mail.

The use of electronic mail enables relaying information from one terminal or machine to another, and preferably allows different operations (including entry to a dictation terminal, application of automatic speech recognition, and operation of a correction terminal) to occur on isolated computer networks. The machines which perform these separate operations need not be connected to any of the same equipment, or a common network, other than that loose (and usually global) network defined by an e-mail system. Furthermore, the respective machines and terminals need not be operated at the same time. All operations can be conducted in a manner that is off-line, ie. involving batch rather than real time processing. A correction terminal preferably must receive the data from the said at least one automatic recognition processor prior to or simultaneously with the initiation of the correction process at the correction terminal (and, likewise the automatic speech recognition process cannot proceed before receiving data from a user terminal).

The term "electronic mail" is intended to include Internet "File Transfer Protocol" and "World Wide Web", the latter being based on the Hypertext Transfer Protocol (HTTP).

The automatic speech recognition processors are preferably distributed remote from the server. The server preferably communicates with at least one speech recognition processor by electronic mail.

The text files resulting from automatic speech recognition are preferably sent to correction units. The correction units are preferably remote from the automatic speech recognition processors. Communications from the automatic speech recognition processors to each correction unit are preferably undertaken under the control of the server, and preferably by electronic mail. The correctors are preferably remotely distributed.

The corrector units can preferably communicate to said at least one user terminal by electronic mail.

In a second aspect, the invention relates to a speech to text convertor comprising at least one user terminal for recording speech, at least one automatic speech recognition processor, and communication means operative to return the resulting text to a user, in which said at least one user terminal is remote from said at least one automatic speech recognition processor, in which electronic mail is used to send text data resulting from automatic speech recognition together with the recorded speech data to a correction unit for manual correction. The text data and speech data are preferably sent together in a single file. The file preferably also includes timing data for relating text to speech. Preferably each word of text has an associated start and end time recorded as part of the timing data. The text data can include text alternatives corresponding to a spoken word.

Preferably said at least one user terminal and said at least one automatic speech recognition processor communicate using electronic mail.

Electronic mail can be used for communications between each of said at least one user terminal and a remote server which is operative to control assignment of the speech files to the automatic speech recognition processors.. The processors can be distributed remote from each other and the server. Electronic mail can also be used to send text files to output terminals.

As regards the invention in both first and second aspects:

The recorded speech is preferably continuous speech.

The server acts to control assignment of recorded speech files for processing to automatic speech processors by queuing the received speech files and submitting them according to predetermined rules. This allows more efficient use of the available automatic speech recognition resources, according to an off-line or batch processing scheme.

Speech to text conversion can be done as a single fully automatic operation, or as a part-automatic and part-manual operation using the automatic speech recognition processor and corrector unit respectively.

Undertaking the speech to text conversion in a non-interactive and off-line basis prevents the user switching repeatedly between speech recording and speech correction tasks. This results in improved efficiency.

The predetermined rule or rules by which the server queues jobs can be according to urgency or user priority ratings.

The corrector unit preferably includes a visual display unit for display of the text and a manual interface, such as a keyboard and/or mouse a foot pedal control, usable to then select text portions.

Correction is effected by the manual operator. The correction can be recorded and transmitted back to the automatic speech recognition processor which undertook the automatic speech recognition for adaption of the operation of the automatic speech recognition processor. These corrections are preferably sent by electronic mail. The adaption has the effect of making the automatic speech recognition more accurate in future processing.

The recorded speech can be sent to the selected correction unit for correction of the text file resulting from automatic speech correction. The server can control this selection. The choice of correction unit can depend on the accent of the speaker of the recorded speech, in particular the files can be sent to a correction unit in an area where that accent is familiar, or to a correction unit where the particular human corrector is familiar with that accent.

The present invention relates in its various aspects both to apparatus and to corresponding methods.

In a third aspect, the present invention relates to a method of operating apparatus, the apparatus comprising a plurality of connected nodes, the method comprising the steps at a first node of automatically reading an instruction from a sequential series of instructions, executing the instruction which provides resultant variable values, and storing the resultant variable values in a set of variable values in a memory, the values including an indicator of the instruction read, the method further comprising interrupting operation at the first node and sending the series of instructions together with the resultant variable values to a second node, and the steps at the second node of automatically determining the last instruction executed and the resultant variable values therefrom then reading and executing the following instruction using a selection from the stored set of variable values as initial values for the following instruction. This method of operating apparatus is preferably for speech to text transcription.

In the preferred system, this method allows so-called pack up and move distributed processing. The nodes are preferably user terminals, a server, and correction terminals. The instructions can be calls to computer programs or commands. A command can be a mail move command indicating an electronic mail address to which specified files are to be sent. The computer programs can be for various operations required in speech to text transcription such as, speech capture, automatic speech recognition, error correction, and/ or automatic speech recognition adaption.

In its third aspect, the present invention also relates to corresponding apparatus.

DETAILED DESCRIPTION OF THE DRAWINGS

A preferred embodiment of the present invention will now be described by way of example, and with reference to the drawings, in which.

DETAILED DESCRIPTION OF PREFERRED EMBODIMENT

Figure 1:
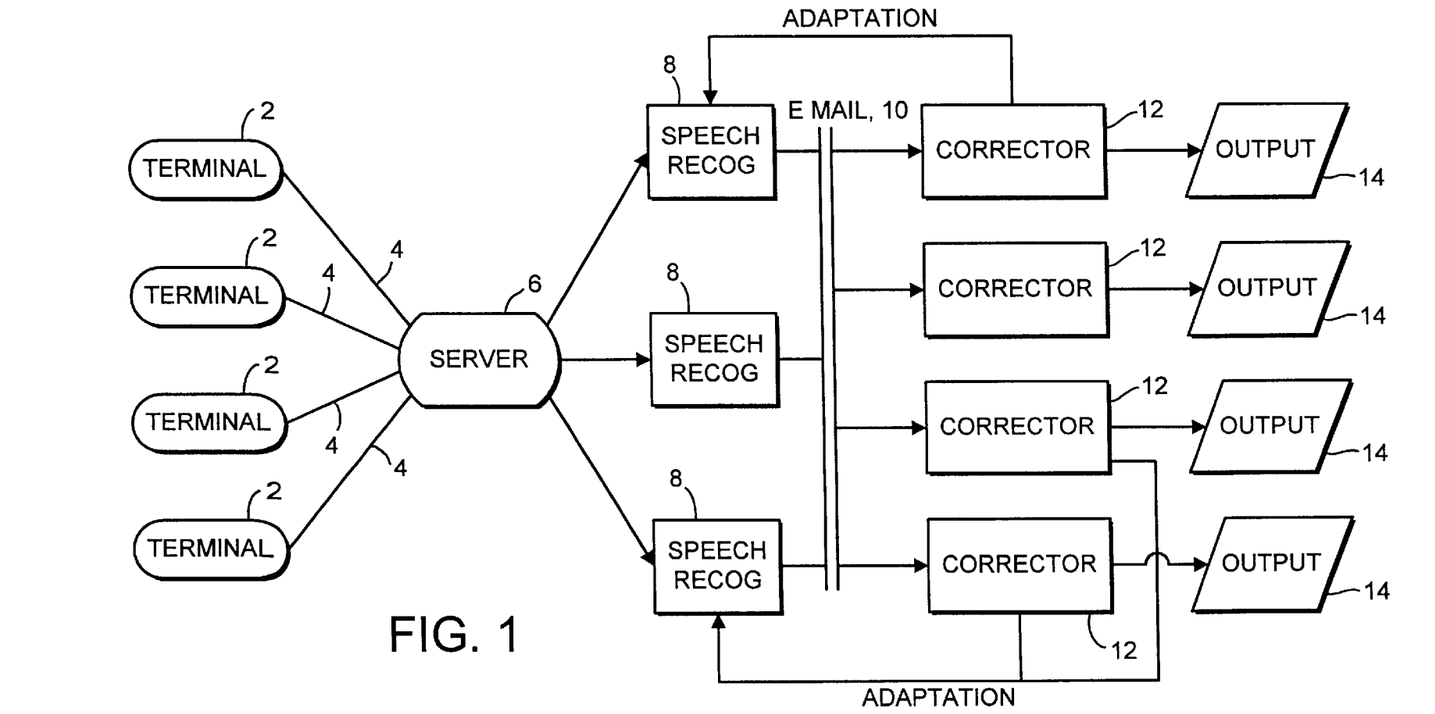
FIG. 1 is a simple schematic illustrating the speech-to-text dictation system.

As shown in FIG. 1, the system consists of user terminals 2 attached by E-mail or phone links 4 to a server 6. The server is connected via a network to a number of processors 8 for speech recognition. These processors 8 are connected via electronic mail (E-mail) links 10 to corrector terminals 12. The corrector terminals 12 will be described in more detail later. Each corrector terminal 12 has at least one output terminal 14.

The system basically operates by speech being captured at the terminals 2 and sent via links 4 to the server 6. The server controls the speech-to-text conversion operations in particular by sending the speech to speech recognition processors 8 for conversion to text data. This text data is transferred via E-mail 10 to remote corrector terminals 12. The text data is displayed and corrected by an operator. After correction the text is output via output terminal 14 and returned to the client. The corrections made are reported to the speech recognition processor 8 for adaption purposes to improve the accuracy of subsequent speech recognition.

As will be discussed below, the server 6 acts to queue the speech-to-text conversion jobs and assign them to the various speech recognition computers 8.

A client may submit dictation at any time, and under the control of the server 6, this is forwarded to a selected speech recognition processor 8 for processing.

Basic Function of the Dictation System

Figure 2:
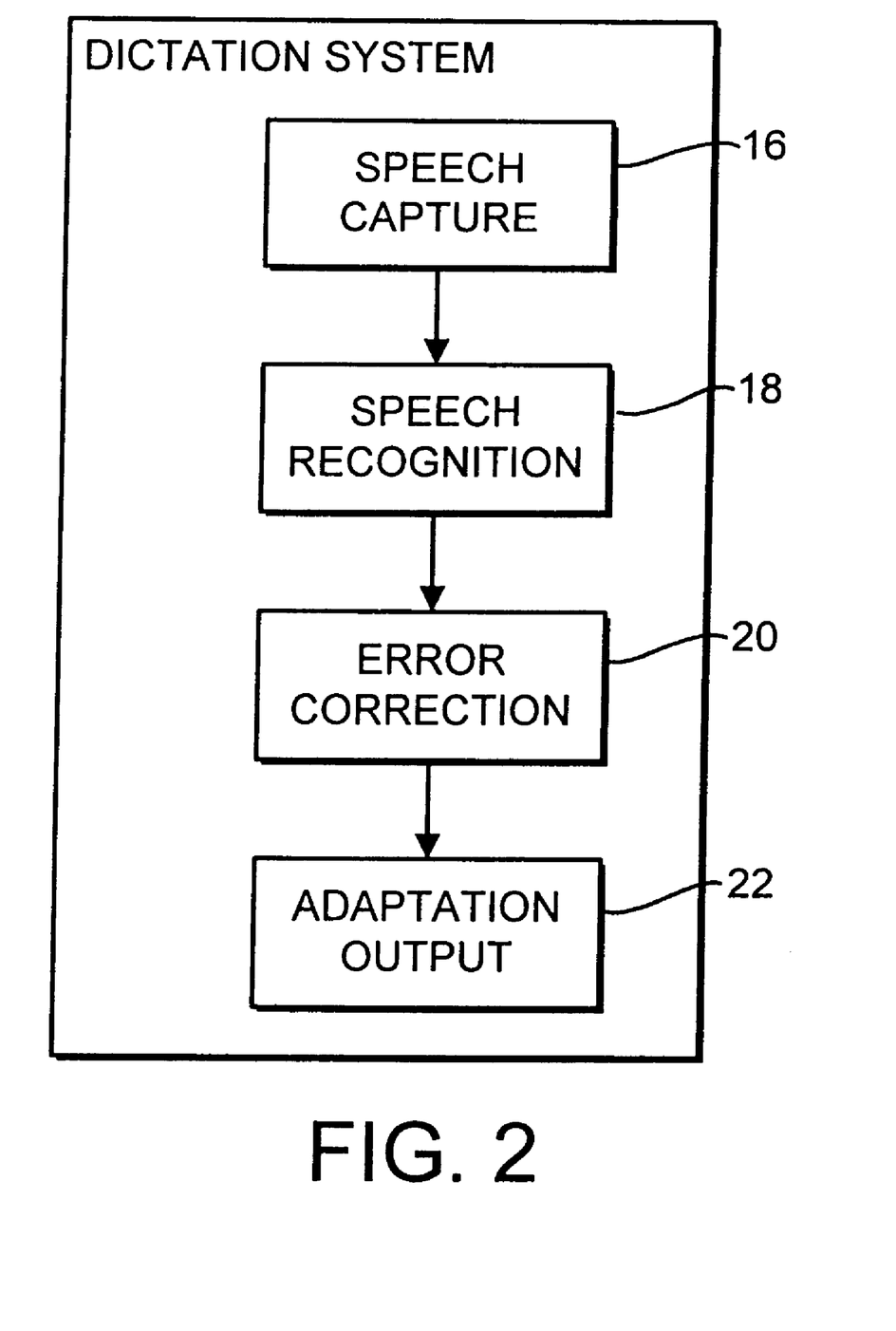
FIG. 2 is a simple block diagram illustrating the basic function of the system.

As shown in FIG. 2, the basic stages in the operation of the dictation system, which are shown in FIG. 1, are as follows:

There is a first stage of speech capture 16 in which the speech is recorded. There is then a stage of speech recognition 18. The subsequent stage is one of correction 20 and the final stage 22 is one of speech recognition adaption and text output.

Figure 3:
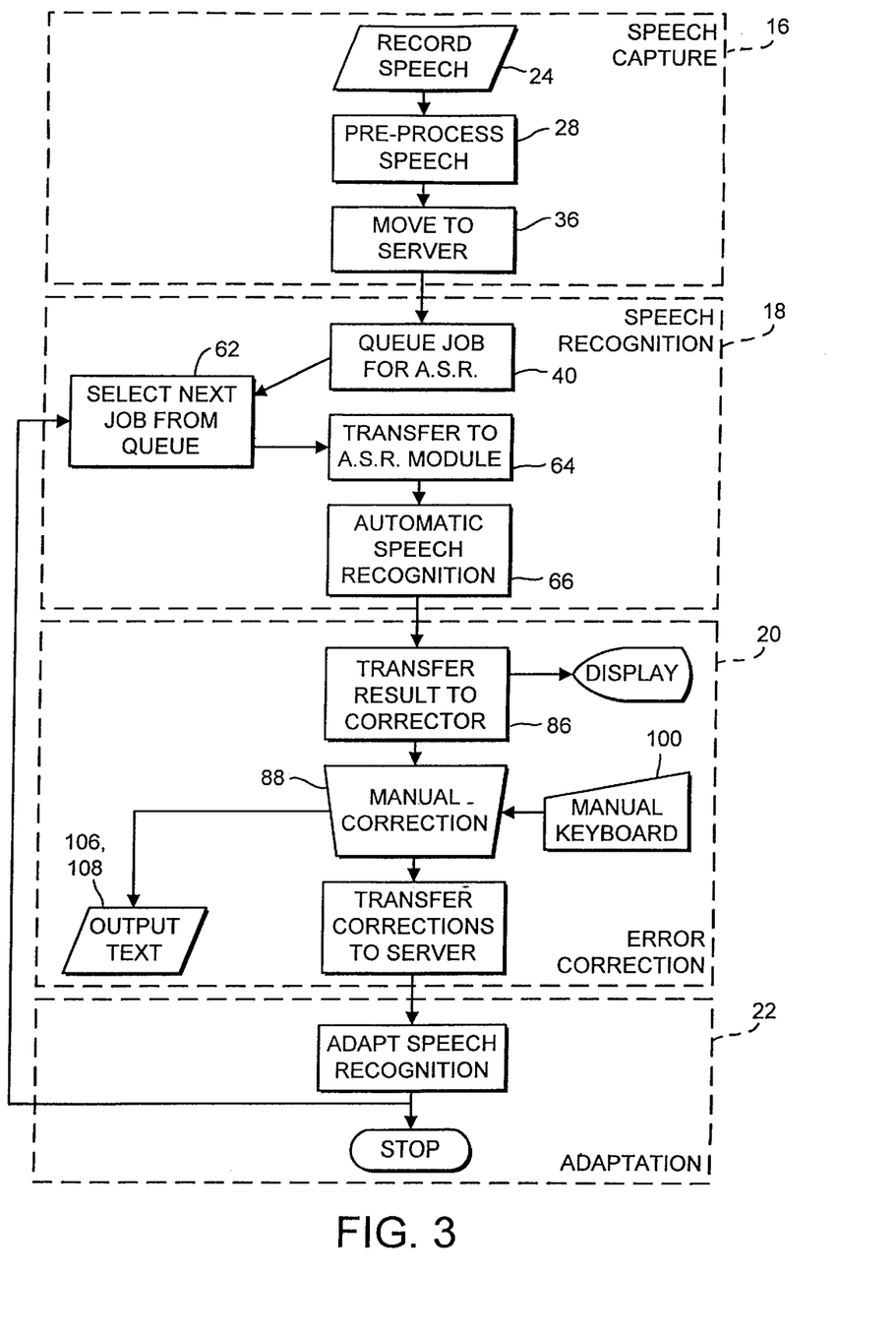
FIG. 3 is a schematic diagram illustrating the function shown in FIG. 2 in more detail.

Looking at these four stages in more detail as shown in FIG. 3, the speech capture stage 16 includes steps of speech recording followed by speech pre-processing followed by a step of transferring the pre-processed speech to the server in a "pack up and move" operation as described later.

The speech recognition stage 18 starts with a step of queuing the job for automatic speech recognition (ASR). When the job is selected from the queue, it is transferred to a selected ASR processor 8. The operations of queuing and forwarding jobs are undertaken under the operation of the server 6, as discussed in more detail below. The speech is then operated on to produce a text file in an automatic speech recognition step.

In the error correction stage 20, the uncorrected text file is transferred to a corrector terminal 12 where it is displayed on a visual display unit (VDU). A manual operator controls a manual keyboard to effect manual correction. The corrected text is then returned to the client. This can be by being printed out and dispatched by post. Alternatively the text can be sent by fax or via the computer network, and server, back to the client terminal 2 or another designated user terminal 2 by E-mail. The corrections are transferred to the server.

In the adaption stage 22, the corrections are returned from the server to the automatic speech recognition computer where they are used to adapt the speech recognition for greater accuracy in subsequent processing.

The various processing steps and operation of the server will now be described in more detail.

Speech Recording, Pre-Processing and Transfer to the Server

In the preferred embodiment, the user terminal 2 is a personal computer of the multi-media type including a voice recorder. In other embodiments, it could be a telephone handset or dictation recorder eg. dictaphone, or some other type of computer. A telephone handset can be digital or analog and could be cellular or radio handset or any other standard equipment for relaying audio speech. In further embodiments the user terminal could be a voice mail terminal or a recording apparatus as used in court rooms. The speech is recorded in continuous English, although the system could, of course, be adapted for other languages.

Once recorded, a request for dictation, which includes the recorded speech, is sent to the server 6. In preparing the dictation request, in some types of user terminal 2, as in the preferred embodiment, the speech is pre-processed so as to reduce the size of the dictation request.

The dictation request is sent to the server 6 via E-mail.

Figure 4:
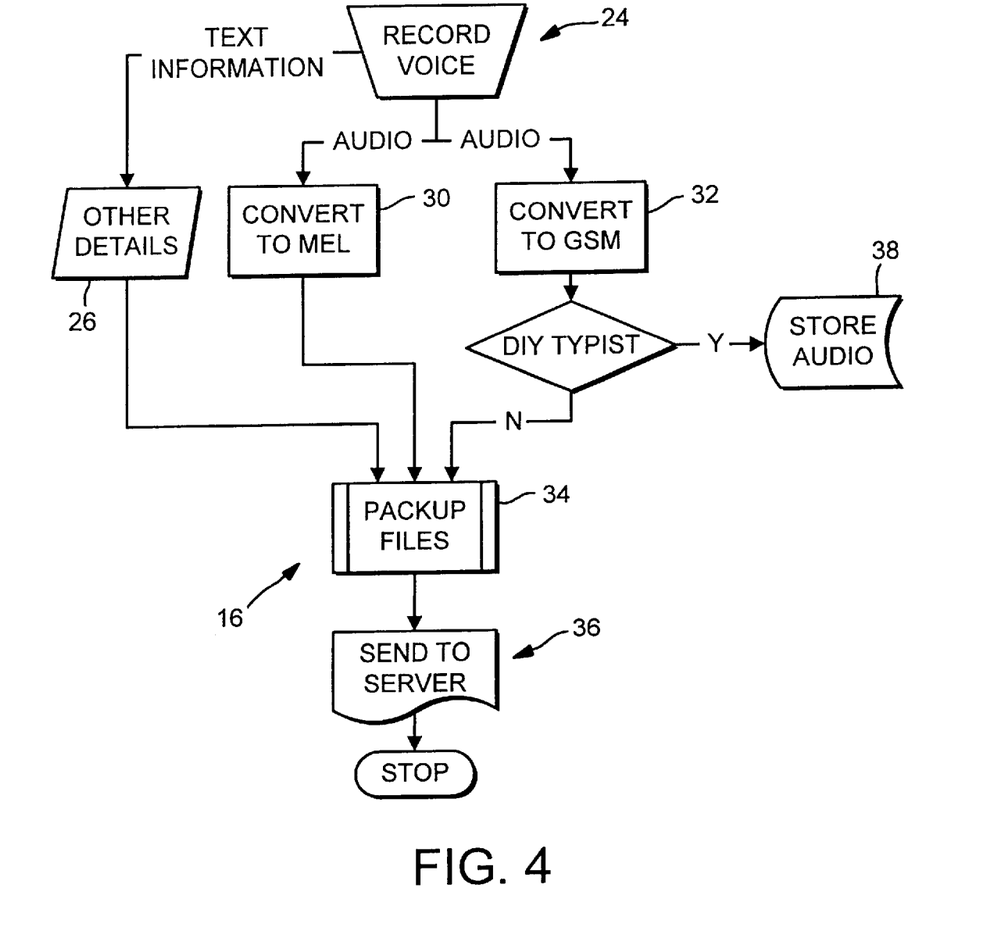
FIG. 4 is a schematic diagram illustrating the speech capture stage of the function.

As shown in more detail in FIG. 4 the speech capture stage 16 includes recording speech 24; which is, in the preferred embodiment, via a microphone input port on the personal computer user terminal 2. This user terminal 2 simulates an audio-cassette recorder in that the user is able to record, pause, rewind and play. Furthermore full-stop indicators can be included automatically in previous pause positions in the recording, and the user can rewind to a previous pause position to overwrite a sentence or series of sentences.

The user can indicate, via the keyboard (not shown) of the user terminal 2, text information of other details 26, for example, subject of the speech, language used, priority level for transcription, desired word-processor font and style template (eg. in Microsoft Word) of the resulting transcription.

The recorded speech 24 is then pre-processed 28 by conversion into two compressed digital data files. The recorded speech is processed 30 to derive a MEL file representation of the speech spectrum, and is also processed 32 to produce a compact GSM (Global System for Mobile) file by compression. A MEL file is a standard representation of the speech signal, see, for example, "Comparison of Parametric Representations for Monosyllabic Word Recognition in Continuously Spoken Sentences" by S Davis and P Mermelstein in Institute of Electronic and Electrical Engineering, IEEE ASSP-28, No 4, pp 357–366, 1980.

The MEL and GSM compressed representations of the speech are of sufficient quality to provide for accurate speech recognition whilst having a reduced amount of data which is required to be transmitted, and allowing intelligible audio replay.

The MEL and GSM compressed representations are packaged 34 into a single file for transmission together with further processing instructions and the other details (of subject etc). This is a "pack up and move" operation as described below. The file is then moved 36 to the server 6. The whole operation is performed as a built-in function described more fully below.

If the user has nominated himself or herself to perform manual correction of the result of automatic speech recognition (described in more detail below), the GSM compressed representation is electronically marked for DIY (Do it yourself) correction and is not transmitted to the server 6 but instead stored 38 in the terminal 2 for future recall. The user may elect that the GSM representation be sent via the server 6 to another user terminal 2 where he or she will correct the text data resulting from automatic speech recognition which is also sent to that other user terminal 2.

Server

The server, which is made up of a group of dedicated computers retrieves E-mail by polling or otherwise accessing an electronic mailbox, and acts to queue and control the dictation requests and to forward them to appropriate speech recognition processors 8. Basically, the server 6 can be considered as a multiple-input multiple-output queue controller. The server 6 provides multiple access to the automatic speech recognition (which can be considered as a finite resource) by delaying dictation requests until a speech recognition processor 8 is available. Overall delay is minimised and depends both on the loading of the system and timing of the dictation request. A priority is assigned to each dictation request depending on urgency and the grade of service available to particular clients. Essentially, the server 6 acts to delay processing of a dictation request until resources are available.

The following operations having been performed on the user terminal: pre-processing client speech into a dictation request, and packup-and-moving to a server (using electronic mail for transfer), the server acts to control the following operations:

1. queuing the execution of the transferred dictation request,
2. sending the dictation request to a speech recognition processor,
3. dictation processing using automatic speech recognition,
4. packup-and-moving the resultant draft text document to a corrector terminal, The correction terminal then is used to correct the draft text document, pack-and-moving the modifications of the dictation made at the connector terminal back to the server, the server then operates to:

5. submit the modifications to the adaptive learning process of the ASR processors, and
6. forward the text document to the originating client.

The server 6 operates in a manner analogous to an interpreter for DOS batch files, Windows NT command files or UNIX shell.

The server 6 controls the sequence of operations according to a "pack-up and move" scheme, which allows the degree of processing which has been undertaken to be included with the speech data as processed to that point in time and transferred to another part of the system for subsequent processing. The names and contents of speech files and other associated data files are also "packed" in the sense that references to them are included in the "pack-up and move" commands issued by the server 6.

Opportunity is provided for machine and human interaction in the document creation process. The information is initially derived from a high quality speech recording. It is processed in a form which makes possible the intelligible replay of the speech and machine-based automatic decoding of the content Pack Up and Move The server 6 (and also each user terminal 2 and correction terminal 12) is operated such that the server 6 (user terminal 2 or correction terminal 12) implements a series of operations, known as a "shell" for interpreting (by reading and executing) instructions defined in a script. A script is a text file consisting of a series of lower level instructions to be performed sequentially. These instructions include calls to subroutines, which can be notionally external computer programs, and calls to so-called "built-in" commands as explained more fully below. The external computer programs are for undertaking the various processes required in the transcription eg. as shown in FIGS. 4 to 9.

The server 6 (user terminal 2 or corrector terminal 12) scans each successive line of the script searching for known variable names (specifically alphabetical sequences preceded by a dollar symbol). If a known variable name is found, the corresponding value is read in from memory. The first word of each line of the script is also checked against a list of "built-in" commands. If found, a "built in command" is executed as described below. Otherwise, the first word is assumed to be the name of an external computer program to which a subroutine call is made.

The script is interpreted line by line until the end of the script is found or some built in command indicates that operation should stop.

Figure 10:
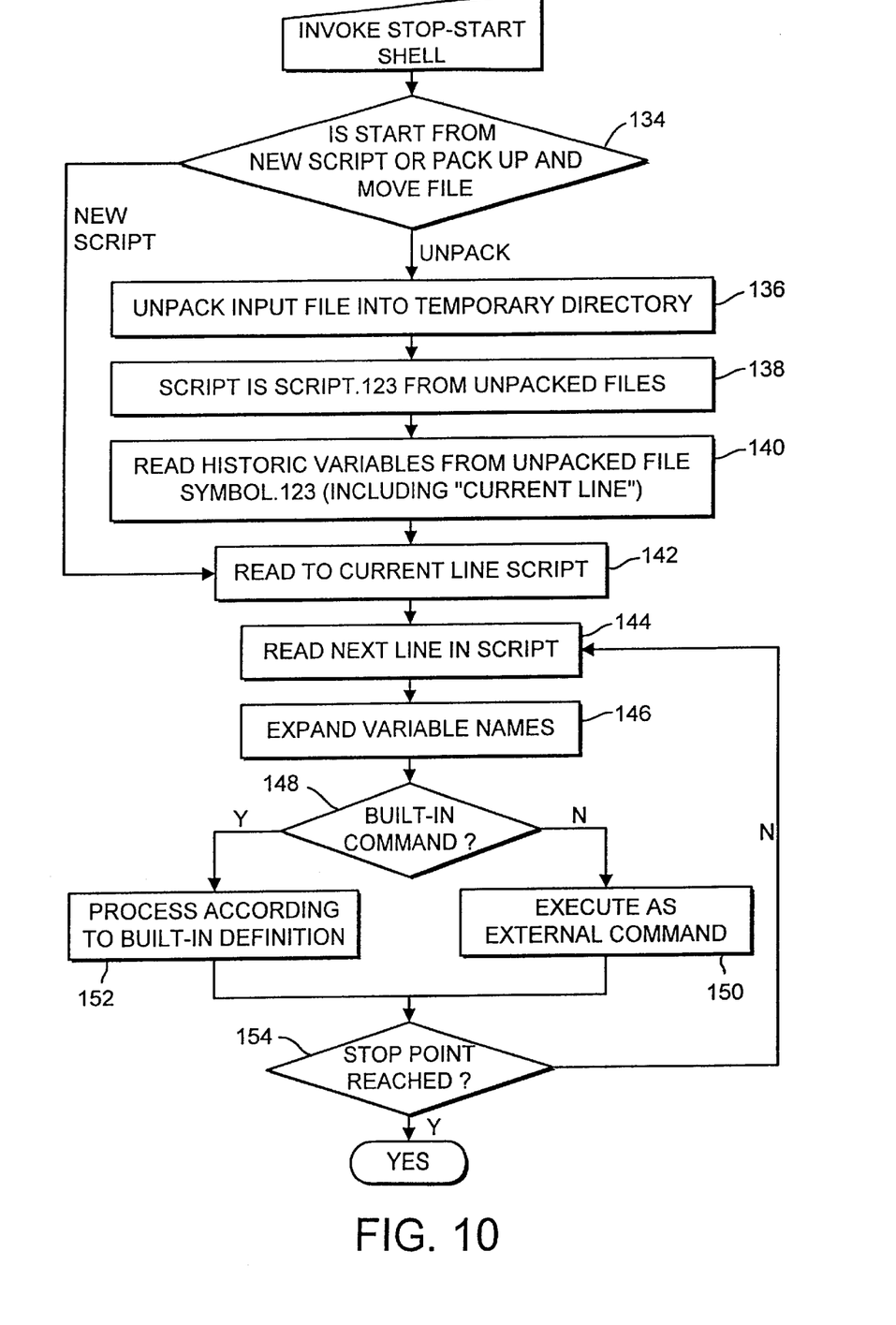
FIG. 10 is a schematic diagram illustrating the "pack-up and move" functioning of, for example, the server.

The sequence of operations starts, as shown in FIG. 10, by the server 6 determining 134 whether the file for interpretation is a new script file or a file which has been previously partially executed (known as a "pack-up and move" file) resulting from a "pack-up-and-move" command as described below.

If the file is a "pack-up and move" file, a temporary directory is created to which the file is written 136. The pack-up-and-move file is in two or more parts; one is a copy of the original script file, denoted in FIG. 10 by SCRIPT.123, which is opened 138. The second part is a copy of the symbol table, ie. the values of variables as were current at the time of execution of the last pack-up-and-move command. The symbol table, denoted SYMBOLS.123 in FIG. 10, is read 140 to provide the values to be used as initial values subsequent processing. One of the variable values is the line number denoted current line number, at which interpretation stopped previously. The script file is then read 142 until that current line number is reached. Other parts of the pack-up-and-move file are copies of those files that were specified for transfer by the last pack-up and move command. These files are made available (in a special temporary location) for subsequent operations.

The next instruction is then selected 144 as the first to be read and executed in resumed processing and variable values are taken 146 from the symbol table. The instruction is then analysed as mentioned above by inspecting its first word, to determine 148 whether the instruction is to a built-in command or a call to an external program.

A call to an external program is handled 150 by the operating system of the server 6 in a conventional manner. The resultant variable values being returned to the symbol table and the line number in the symbol table being incremented.

Built-in commands are handled 152 as described below.

When the stop command in the script is reached the execution terminates 154, else the next line of the script is read 144 and executed.

Built-in Commands

So-called "Built-in" commands include those for variable value control and basic control commands, such as IF and GOTO.

Figure 11:
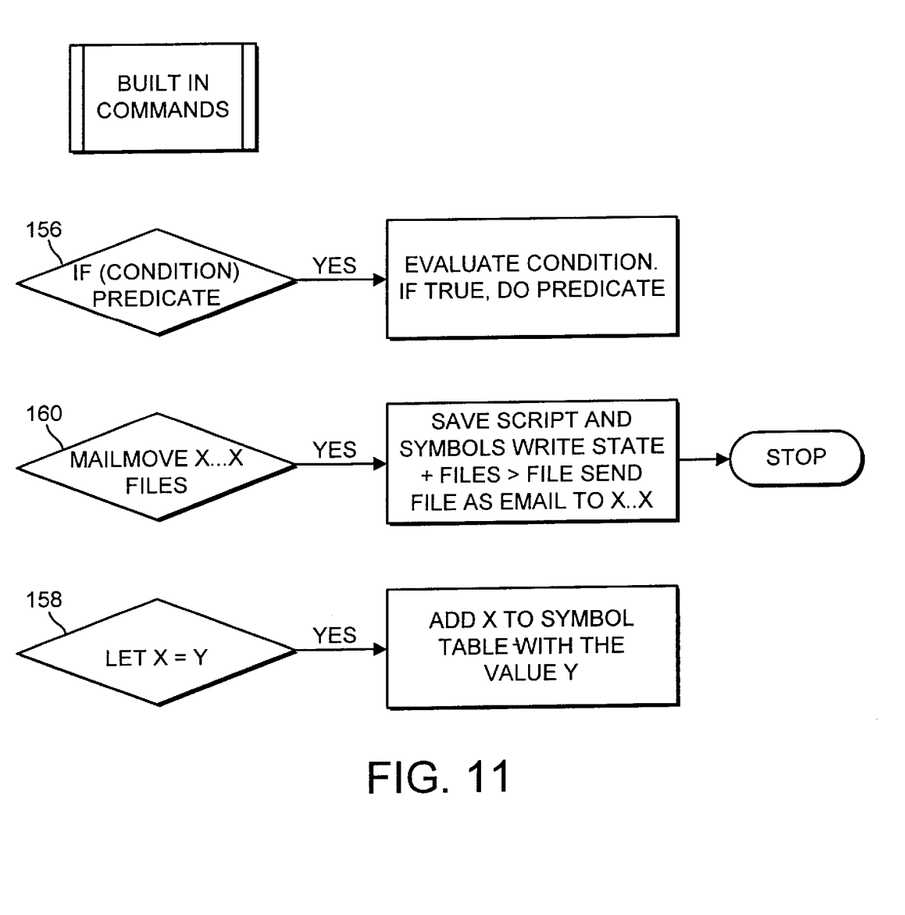
FIG. 11 is a schematic diagram illustrating the use of built-in commands in the pack-up and move functioning.

Examples of three built-in commands are shown in FIG. 11 together with indications of how each command is executed.

If the instruction is of the form "IF (condition) operation" 156, the condition is tested and if found satisfied, the operation is performed.

The LET command 158 is for altering a variable value in the symbol table.

There is an instruction 160 in the form "mailmove X.X files", where "X.X" is a target electronic mail address and "files" are a list of the files required in subsequent processing. If this instruction is received, then the current script file is combined into a single composite file with the file of variable values (known as the symbol table) and the files specified. This combined file is known as a "pack-up and move" file. As mentioned previously, the symbol table includes a current line indicator. The file is sent by electronic mail to a target address.

This "pack-up and move" file resulting from the mailmove operation contains all the information necessary to continue the processing at a later time, from where execution last left off, as described above.

The ability to pack-up and move is useful in a distributed process such as the transcription operation of the preferred system as it allows a process to be started at one location eg. a user terminal 2 or corrector terminal 12 and continued elsewhere eg. on the server 6.

Automatic Speech Recognition

The server 6 processes each dictation request and forwards it to an available speech recognition processor 8 where automatic speech recognition is undertaken resulting in a text data file. The automatic speech recognition is undertaken using conventional methods. The method which is used is Hidden Markov Modelling of speech as described in "Automatic Speech Recognition" by Kai-Fu Lee, Kluwer Academic Publishers 1989.

Figure 5:
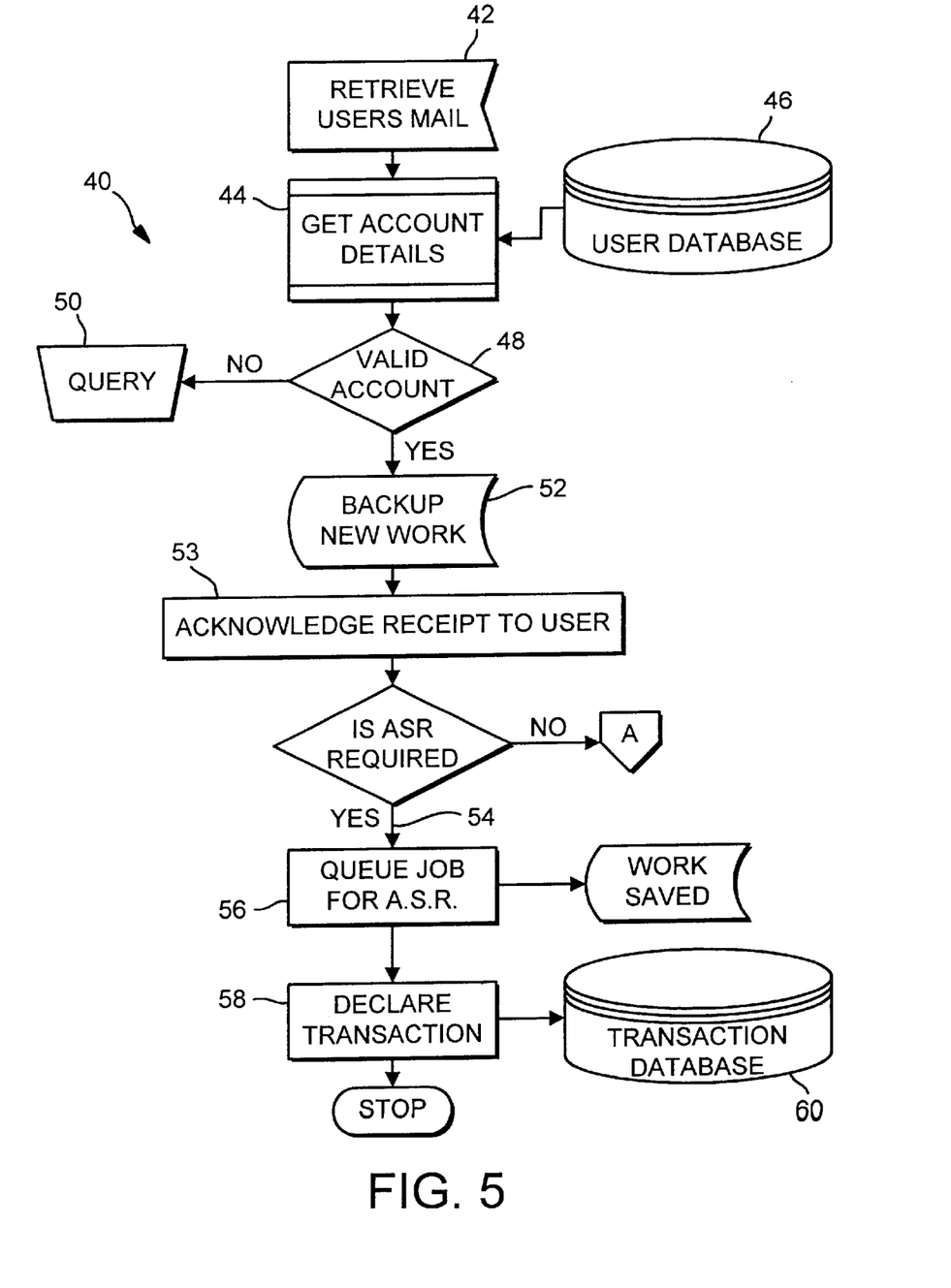
FIG. 5 is a schematic diagram illustrating the first part of the speech recognition stage, namely job control.
Figure 6:
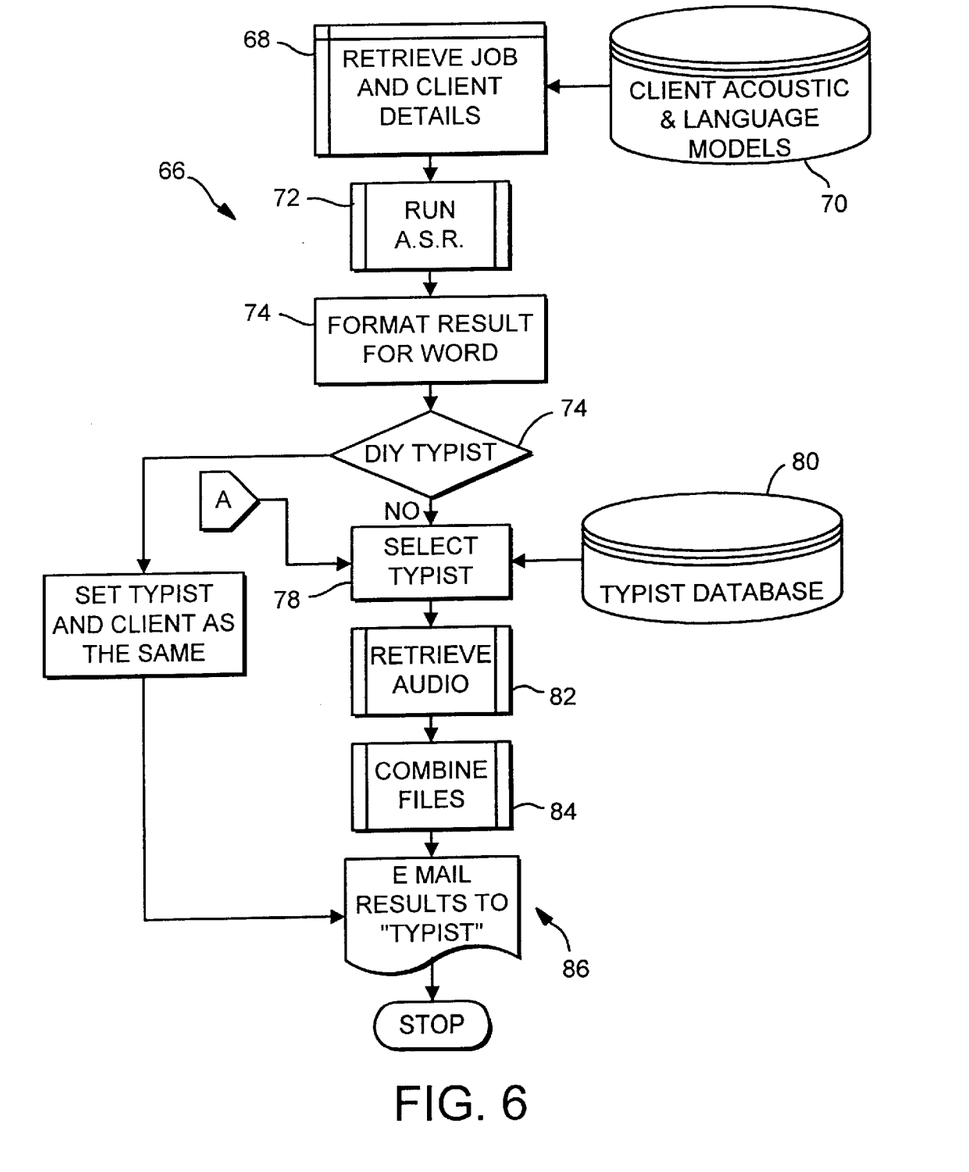
FIG. 6 is a schematic diagram illustrating the second part of the speech recognition stage, namely automatic speech recognition.

The first part of the speech recognition stage 18 including queuing a job for automatic speech recognition is shown in FIG. 5. The second part including running automatic speech recognition and subsequent assignment to a corrector terminal 12 is shown in FIG. 6.

As shown in FIG. 5, queuing 40 a job for Automatic Speech Recognition involves the server 6 retrieving 42 the E-mail message which is the user's transcription request. The transcription request is a single file with a fixed name. The format of the transcription request is determined by the pack-up-and-move control scheme of the server 6 and includes information identifying the user.

The following steps are then undertaken under the control of the server 6 using its pack-up-and-move control scheme. Firstly, the user's account details are retrieved 44 from a database 46 and the status of the account as valid or not is checked 48. If an account is found to be invalid, a query 50 is flagged to an administrator.

If the status is acceptable, the transcription request is recorded 52 and receipt is acknowledged 53 to the user by electronic mail.

If automatic speech recognition is required 54, the transcription request, otherwise denoted as a "job", is queued 56 for automatic speech recognition. This is denoted or declared as a "transaction" 58. Information regarding the job which has been queued is then sent to a transaction database 60. By querying the database the administrator can determine the history and current status of each job.

Figure 8:
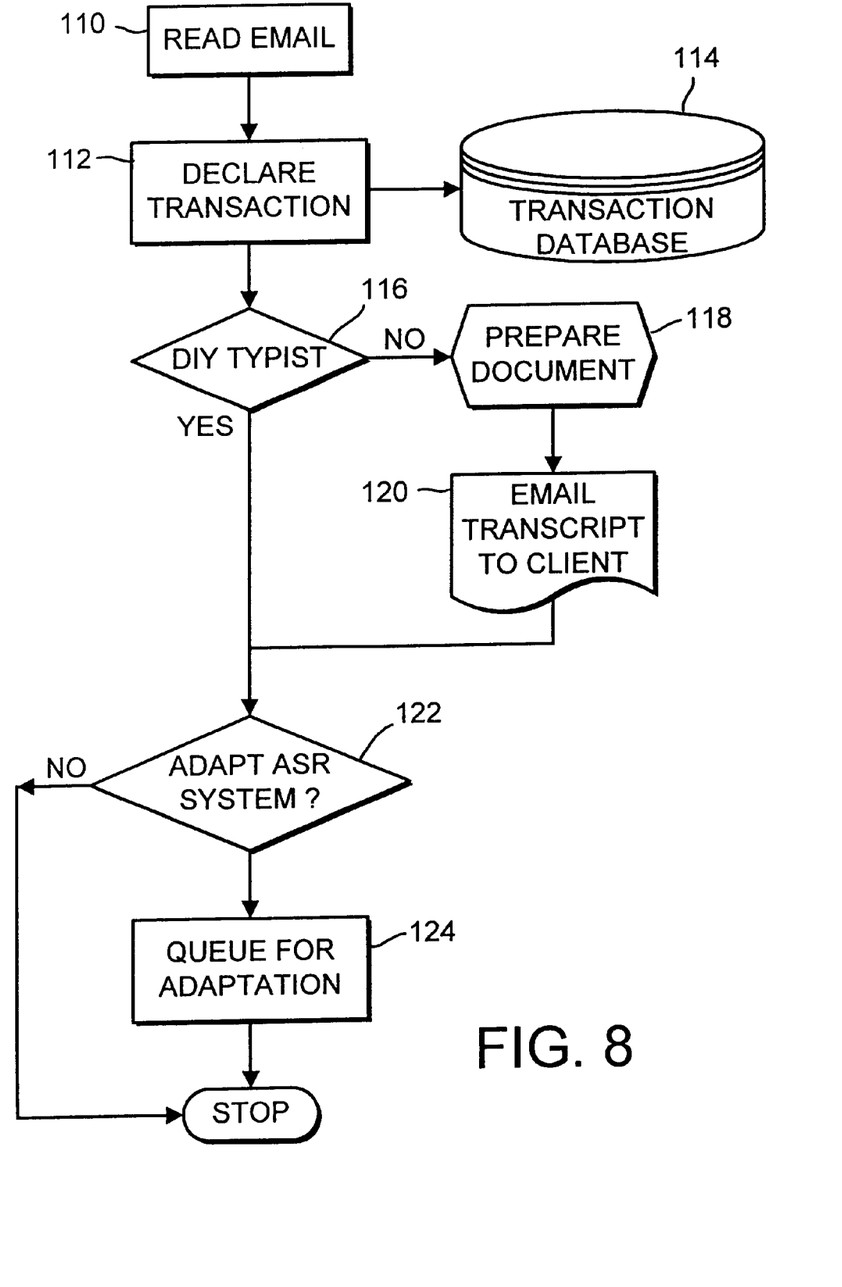
FIG. 8 is a schematic diagram illustrating the first part of the adaption stage, namely queuing for adaption.

The server 6 controls assignment of jobs to speech recognition processors 8. When a processor 8 becomes available, as shown in FIG. 8, the next job is selected 62 from the queue and transferred 64 to the processor 8 in a pack-up and move operation.

Automatic speech recognition 66 is then undertaken, basically as shown in FIG. 6. Client details are retrieved 68 by the processor 8 from a database 70 including statistical models of the user's voice ("acoustic models") and also language models based on text subject, eg. legal, medical etc. These models and the job for transcription are used in automatic speech recognition 72 which involves applying the models to decode the speech and provide corresponding transcribed words in a result file which includes data of the beginning and end times of each utterance.

The result file is processed 74 into a format suitable for word-processing using a conventional text word processor, such as Microsoft Word. The timing information is included in the processed result file in a hidden manner for use at the subsequent error correction stage 20.

The automatic speech recognition processor 9 provides text supplemented with timing information, preferably for each text word. This information can be considered as a lattice, also known as a word graph, as described in "Large Vocabulary Continuous Speech Recognition Using Word Graphs", X Aubert and H Ney, Institute of Electrical and Electronic Engineering, Proceedings of the International Conference on Acoustics, Speech and Signal Processing, 1995, PP 49–52.

A corrector terminal 12 must then be chosen to enable proof-reading and manual error correction of the result file. If the user does not elect 76 to do this himself or herself, the server 6 acts to select a corrector terminal 12 from a database taking into account the availability of corrector terminals, and characteristics of, the human correctors who use them, matching, where possible, the user geographical domain with the domain of the human correctors regional or national accent (if any), and the area of specialisation (legal, technical, medical etc) of user and corrector. Mostly, the server 6 controls to which corrector terminal 12 a file is sent either dependent upon the clients wishes or alternatively dependent on selecting a corrector in a geographical area where there is expected to be in use a similar speech dialect or accent to that of the client who recorded the speech.

The recorded speech, ie. audio, file is also retrieved 82 in the server 6, and combined 84 under control of the server 6 using its pack-up-and-move scheme with the transcription data of the result file. This combined file is then transferred 86 to the selected corrector terminal 12 by electronic mail.

Speech Transfer to a Corrector

Once the automatic speech recognition process is completed, the server 6 E-mails the resulting text file to a corrector terminal 12. As transmission is by E-mail, data transport costs are low. Furthermore differences in time zones are exploited, in particular by E-Mailing to a corrector terminal during its manual operators working hours.

The information transmitted from an automatic speech recognition processor to the corrector terminal 12 constitutes recorded speech data that allows intelligible replay of the original dictation speech, text that corresponds of that dictated speech, timing data. In some other embodiments, the information provided by automatic speech recognition processors can include text corresponding to alternative interpretations of that dictated speech, and statistical data of the likelihood of particular interpretations being correct.

Error Correction

At the corrector terminal 12 which includes personal computer, a VDU and a keyboard, the text file is viewed using standard wordprocessor software. The original recorded speech is sent with the text file to the corrector terminal. The system includes several corrector terminals.

The file is received by the corrector terminal 12 by E-mail. The recorded speech is sent in a compressed format.

The text is corrected using a conventional keyboard. Words highlighted in the text are simultaneous output as speech audio signals from a loud speaker of the correction terminal 12. This allows a simple "watch and listen" system of correction which is very time efficient and is described in more detail below.

Figure 7:
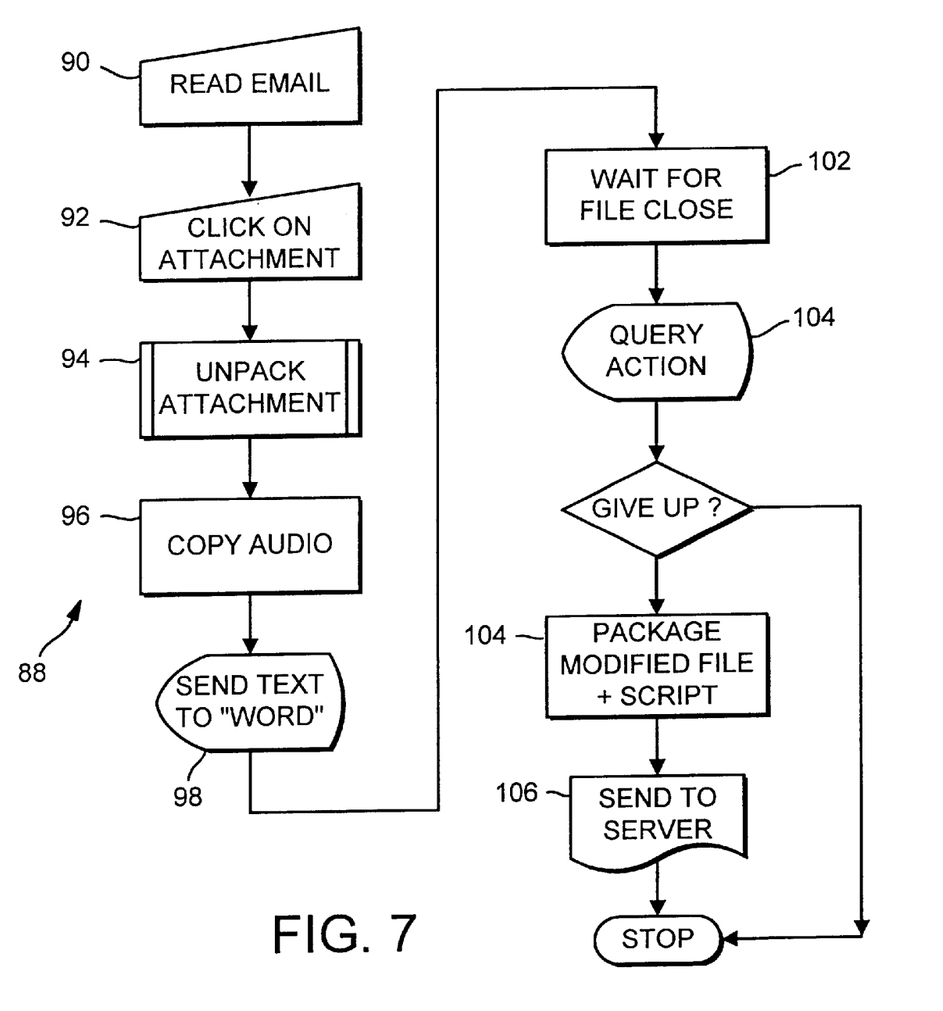
FIG. 7 is a schematic diagram illustrating the error correction stage.

As shown in FIG. 7, manual error correction 88 is undertaken at the correction terminal 12 by the human corrector who reads 90 the received electronic mail which has a text file attachment of the results file from automatic speech recognition. The results file is "clicked on"-92 ie. selected using eg. a conventional computer mouse, causing pack-up-and-move control to be invoked to unpack 94 the attached result file in which both the transcript and the audio file are found. The audio data is copied 96 into a file having a name which is assigned according a predetermined rule, in particular, in the preferred system, it differs only from the name of the corresponding transcript by its extension name.

The names of the audio file and transcript thus both have names in a format X:/dir1/dir2/name.xxx where xxx differ. The transcript is read 98 into a wordprocessor, such as Microsoft Word where manual correction is undertaken by way of a keyword 100 at the correction terminal 12. In correcting, the hidden timing information and the audio file are used to assist the correction process, using cursor synchronised playback as described below.

Once the correction session has been completed, the text file of the transcript is closed. The corrector terminal 12 acts to monitor closure of the file, and when it so determines 102, acts to enquire 104 of the human corrector whether the modifications are complete. If the answer is yes, the modified transcript is packaged up 104 and sent 106 in a pack-up-and-move operation to the server 6 for onward communication back to the user. Alternatively, it is output 108 to, for example, a printer to be sent to the user by post.

Cursor Synchronised Playback

The result of automatic speech recognition is a text file in which each word is "tagged", ie. associated with, a time vector which relates the word to the word start time and duration within the speech record. This data is encoded in a format invisible to the human corrector as a digital tag. The tag includes a timing vector T which represents the start time and duration of the utterance that is associated with the tagged text word state parameter U which denotes whether or not the word has been scanned, and an optional audio identifier X which refers to the name of the recorded speech file.

For example, a word can have a tag W-XY-199-10 which denotes that the word as recognised is in state W, was produced from speech record XY and has a start time of 199 time units (assuming the speech record starts at time=0) and extends for 10 time units. This data can be encoded in a variety of ways.

Given a set of tagged words and an associated audio data ie. speech file, text and audio are cross-indexed. A position in the audio can be translated into a position within the text document and vice versa. The optional audio identifier information allows simultaneous display of multiple documents, with possible cut-and-paste operations between them. The optional state information allows checking to be undertaken at a later stage that every word has been proof-read.

When the corrector terminal is used in synchronised playback mode, the speech record is replayed over the loudspeaker of the correction unit from the text word on the screen at which the cursor lies. The word at which the cursor lies is highlighted as are the two following words. The cursor position is moved word by word as the corresponding sections of the recorded speech are replayed. The triple-word-highlight feature aids the human corrector in checking the immediately following words have been recognised correctly by the automatic speech recognition processor as the words can be reviewed in context.

As each text word has an associated time vector corresponding to the appropriate time point in the speech record, it is easy to shift forward and/or back through the words to the desired point where synchronised re-play is desired. For example under keypad or mouse (point and click) control (or use of a foot pedal control), the ongoing playback of successive words can be discontinued and the cursor shifted elsewhere to another word. The cursor can be shifted, rapidly if desired, forwards and backwards. If a word is still not clearly understood after playback, it can be played back repeatedly until the human corrector can understand the intended text word and make an appropriate correction via his or her keyboard.

The corrector terminal could operate with some industry standard word processor, such as Microsoft Word, as used for document browsing, and text amendment and correction. By selecting the appropriate icon using a mouse, the word processor operates to display the text file visually on the screen. Stop, play, fast forward and rewind icons are displayed and can be selected using the mouse to control the synchronised playback. Alternatively the keyboard can be used for control. Another option would be to have a foot pedal control.

A personal computer loaded with Microsoft Word processor software is but one example of a word processor in which the facility could be provided; it could be used with other word processors.

Text Return and Automatic Speech Recognition Adaption

Once the correction operation is complete, the corrected text file is faxed to the client, or sent via E-mail through the system to the clients terminal 2, or some other designated user terminal 2. As another option, it can be printed out and dispatched to the client by other means such as by courier or by post.

The corrections which were made are returned to the ASR processor 8 which undertook the automatic speech recognition where they are used to adapt the automatic speech recognition method for greater accuracy in the future. This is done using Maximum Likelihood Linear Regression applied to Hidden Markov Models as described in "Speaker adaption of HMMs using linear regression" by C J Legetter and P C Woodland Technical Report TR 181. CUED, 1994, Cambridge University.

Where the recorded speech is of low quality such as some audio-cassette signals or mobile telephone signals or analogue Telephone signals, the speech-to-text conversion may be handled without the use of automatic speech recognition, by an audio typist.

As shown in FIG. 8, in the preferred embodiment, the transcript returned from the corrector terminal 12 to the server 8 is noted by polling 110 in an incoming-electronic-mail box at which the transcript is expected to be received. When it is returned, a transaction is declared to have occurred 112 and this is recorded in a further transaction database 114. If the job is not flagged 116 as DIY (ie. Do it yourself) correction by the user, it is formulated 118 into an electronic mail message and sent 120 via electronic mail to the user. More specifically, the transcript is a text attachment, suitable for word processor reading, attached to a short electronic mail message.

The server 6 determines 122 whether the user is one to which the automatic speech recognition adapts. If so, the job including the audio file and modified transcript is queued for adaption of the associated ASR processor 8.

Figure 9:
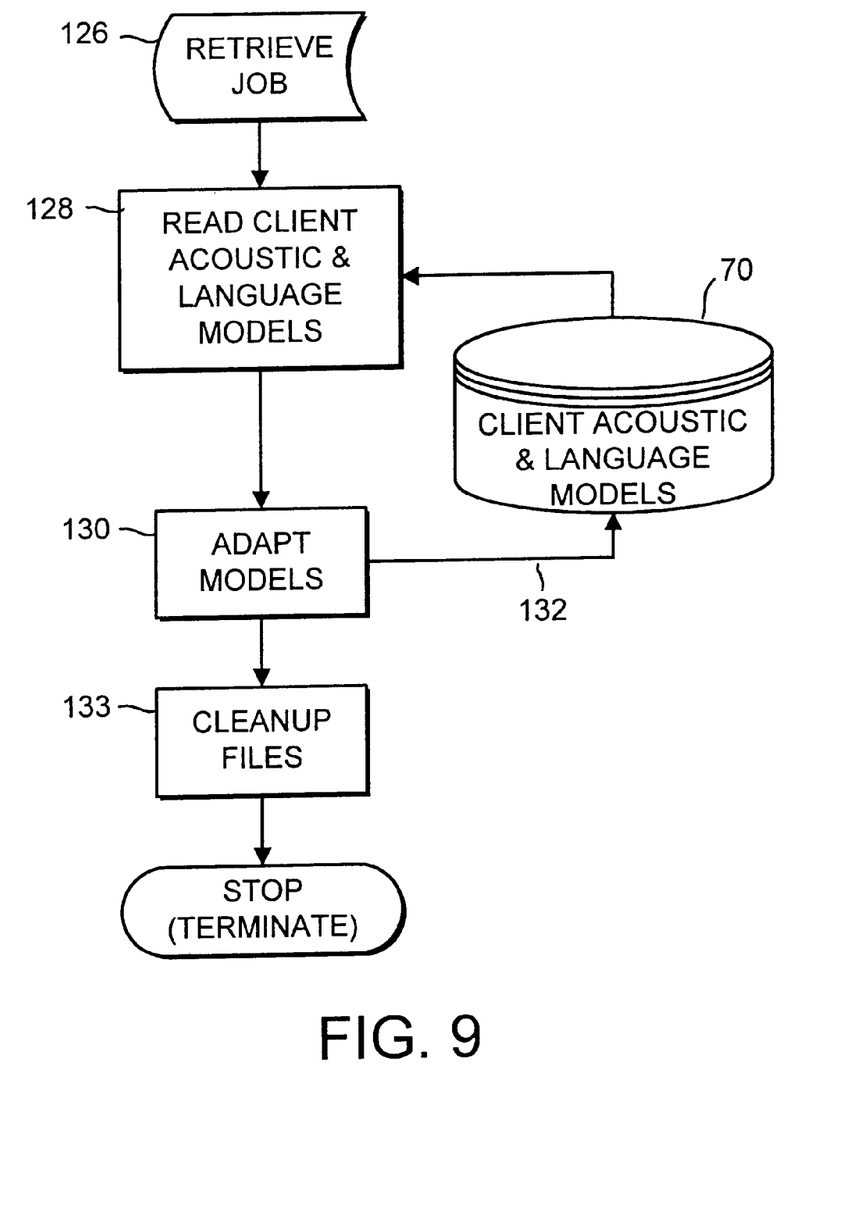
FIG. 9 is a schematic diagram illustrating the second part of the adaption stage, namely adaption.

The "job" is returned to the ASR processor 8 in a pack-up-and-move operation. As shown in FIG. 9, the ASR processor 8 adapts by mathematical processes whereby speech models are fine-tuned to be more accurate dependent upon previous success. Speaker adaption is undertaken whereby there is adaption of models to better fit the speech characteristics of a particular speaker. Language models are also adapted to better fit the likely vocabulary or word usage patterns of a speaker or group of speakers.

The processor 8 retrieves the transcript and corresponding audio speech and also retrieves 128 the acoustic and language models used from the database 70. Models are adapted 130 in consequence and recorded 132 in the database 70. Once the adaption has been completed, any obsolete temporary files on the server are deleted 133.

Division of Operations

In other embodiments, a single task may be sub-divided into multiple individual work-packages to exploit available multiple resources. For example such work-packaging may divide the task of automatic speech recognition across several automatic speech recognition processors, effecting a form of parallel processing which allows a reduced processing turn-around time. Furthermore, a single correction operation may be sub-divided across many correction terminals, possibly operating independently and in different locations and different time zones. Again this technique allows the benefits, such as faster or cheaper document turn-around.

We claim:

1. A speech-to-text conversion system comprising at least one user terminal for recording speech, at leant one automatic speech recognition processor to generate text from a recorded speech file, and communication means operative to return a corresponding text file to a user, in which said at least one user terminal is remote from said at least one automatic speech recognition processor, and electronic mail is used to send text data generated by the automatic speech recognition processor, together with corresponding recorded speech data in a single file, to a correction unit for manual connection of the text file, wherein the electronic mail includes timing data for relating text to speech, and wherein at least some of the words of the text have an associated start and end time recorded as part of the timing data.

2. A system as claimed in claim 1, wherein the text data includes text alternatives corresponding to a spoken word.

3. A system as claimed in claim 1, wherein said at least one user terminal and said at least one automatic speech recognition processor communicate using electronic mail.

4. A system as claimed in claim 1, wherein electronic mail is used for communications between each of said at least one user terminal and a remote server which is operative to control assignment of the speech files to multiple automatic speech recognition processors.

5. A system as claimed in claim 4, wherein the automatic speech recognition processors are distributed remote from each other and the server.

6. A system as claimed in claim 4, wherein the server acts to control assignment of recorded speech files for processing to automatic speech processors by queuing the received speech files and submitting them according to predetermined rules.

7. A system as claimed in claim 6, wherein the predetermined rules by which the server queues jobs is one of urgency and user priority rating.

8. A system as claimed in claim 1, wherein electronic mail is used to send said text file to at least one output terminals.

9. A system as claimed in claim 1, wherein the recorded speech data is continuous speech data.

10. A system as claimed in claim 1, wherein speech to text conversion is done as a single fully automatic operation.

11. A system as claimed in claim 1, wherein speech to text conversion is done as a part-automatic and part-manual operation using said at least one automatic speech recognition processor and said at least one correction unit, respectively.

12. A system as claimed in claim 1, wherein the correction unit includes a visual display unit for display of the text and a manual interface usable to select text.

13. A system as claimed in claim 1, wherein correction is effected by manual operation.

14. A system as claimed in claim 1, wherein the correction of the text file by the correction unit is recorded and transmitted back to the automatic speech recognition processor which generated the text file for adaption of the operation of the automatic speech recognition processor.

15. A system as claimed in claim 1, wherein said correction is sent by electronic mail.

16. A method of converting speech to text comprising recording speech at at least one user terminal, transferring recorded speech files from said at least one user terminal to at least one automatic speech recognition processor remote from said at least one user terminal, generating text files from said recorded speech files at said at least one automatic speech recognition processor, sending the text files and recorded speech files together in a single file by electronic mail to a correction unit, wherein the electronic mail includes timing data for relating text to speech, and wherein at least some of the words of the text have an associated start and end time recorded as part of the timing data, manually correcting the text files in accordance with the recorded speech files at said correction unit, and returning corresponding text files to respective users.

* * * * *